United States Patent [19]

Nakatsukasa et al.

[11] Patent Number: 5,567,796
[45] Date of Patent: Oct. 22, 1996

[54] POLYESTER FIBER

[75] Inventors: Sigeki Nakatsukasa; Kenichi Yoshioka; Kiyoshi Hirakawa; Kazuhiko Tanaka; Masao Kawamoto; Nozomu Sugoh; Atsuko Migaki; Shunro Taniguchi, all of Kurashiki, Japan

[73] Assignee: Kuraray Co., Ltd., Kurashiki, Japan

[21] Appl. No.: 397,252

[22] PCT Filed: Jul. 28, 1994

[86] PCT No.: PCT/JP94/01242

§ 371 Date: Mar. 23, 1995

§ 102(e) Date: Mar. 23, 1995

[87] PCT Pub. No.: WO95/04846

PCT Pub. Date: Feb. 16, 1995

[30] Foreign Application Priority Data

Aug. 6, 1993 [JP] Japan ................. 5-196530
Oct. 4, 1993 [JP] Japan ................. 5-248239
Nov. 26, 1993 [JP] Japan ................. 5-296381
Nov. 26, 1993 [JP] Japan ................. 5-296383

[51] Int. Cl.$^6$ ................................. C08G 63/02
[52] U.S. Cl. ................. 528/272; 428/373; 428/364
[58] Field of Search .................... 428/373, 364; 528/272

[56] References Cited

FOREIGN PATENT DOCUMENTS 116650 12/1982 Japan.
97349 1/1989 Japan.
222172 4/1992 Japan.
5026 5/1993 Japan.

OTHER PUBLICATIONS

Polyesters Containing the Norbornane Structure "Journal of Polymer Science" vol. 10, 3191 3204 (1972) Wilson et al.

*Primary Examiner*—James J. Seidleck
*Assistant Examiner*—Duc Truong
*Attorney, Agent, or Firm*—Oblon, Spivak, McClelland, Maier & Neustadt, P.C.

[57] ABSTRACT

A fiber or filament comprising a polyester copolymerized with 2 to 20 mole % of a compound having a specific structure, which has one or two ester-forming functional groups. The polyester fiber or filament has a low birefringence and excellent dyeability and deep color development. The polyester fiber or filament is provided, when drawn under selected conditions, with not only high shrinkage ratio but also high shrinking stress, and has excellent lightfastness, thereby being useful while replacing conventional highly shrinkable fibers.

5 Claims, No Drawings

POLYESTER FIBER

This application is a 371 of PCT/JP94/01242 filed Jul. 28, 1994.

BACKGROUND OF THE INVENTION

1. Technical Field

The present invention relates to polyester fibers or filaments having improved properties in dyeability, deep color dyeability and lightfastness. The present invention further relates to composite fibers comprising the polyester constituting the above polyester fibers as a component, mixed filament yarns with differently shrinkable filaments or sheath-core textured yarns comprising the above polyester filaments as a component, and blended spun yarns comprising the above polyester staple fibers as a component.

2. Background Art

Polyester fibers represented by polyethylene terephthalate fibers have been used in a wide range of applications because of their superior characteristics. However, the fibers have disadvantages in color brightness, color depth particularly in deep black tone, and color development as compared to natural fibers, such as wool and silk, and semi-synthetic fibers such as rayon and acetate fibers.

These disadvantages are caused, generally, by the fact that polyester fibers are dyed with disperse dyes which tend to give an insufficient brightness to the dyed articles, and that polyester fibers have a higher refractive index in a direction perpendicular to the fiber axis of 1.7 as compared to other fibers, which increases light reflectivity on the fiber surface, thereby increasing the intensity of white light reelection and scattering from the surface of fabrics comprising polyester fibers.

To improve these disadvantages, many proposals for introducing dyeable sites for bright color dyes such as cationic dyes and acidic dyes into polyester fibers have been offered. These modifications have improved the dyed fabrics in color brightness, but achieved no substantial success in reducing the white light reflection and scattering and in improving color depth due to the high refractive index of the fibers.

Japanese Patent Publication No. 42938/1992 proposes covering the surface of polyester fibers with a compound having a low refractive index, to achieve deep color dyeability. The publication mentions as examples of this type of compound organic fluorine and organosilicon compounds.

Japanese Patent Publication Nos. 20304/1987 and 28229/1987 propose a method which comprises forming, on the surface of polyester fibers, fine projections and recesses having a pitch smaller than light wave length, thereby suppressing reflection and scattering of light on the fiber surface.

However, with the fibers covered with a low refractive index compound, the covering film has poor durability against dry cleaning. Besides, the covered fibers, if they have achieved a sufficient deep color dyeability at all, give dyed articles having the new drawbacks of poor hand, colorfastness and lightfastness.

The fibers with a very minutely toughened surface obtained by the above method suffer a damage to the toughened surface during post-processing, which reduces the effect of suppressing reflection and scattering of light on the fiber surface. Besides, fabrics made from this type of fibers tend to have a poor appearance due to wear when they are worn.

One of the modifications of polyester fibers is highly shrinkable fibers, which are used for the following applications: (1) they are combined with less shrinkable fibers, and fabrics made therefrom are heat treated to achieve a bulky hand created by the difference in the fiber length; (2) the highly shrinkable fibers with a large fineness are combined with less shrinkable fibers with a small fineness, and fabrics made therefrom are heat treated to produce fiber length difference, whereby the fine fibers positioned on the fabric surface produce a gentle surface touch and the coarse fibers positioned in the fabric core produces good HARI (anti-drape stiffness) and KOSHI (stiffness); (3) the highly shrinkable fibers are used as ground yarns of pile knit or pile fabrics, thereby increasing the density of loops or fluffs; (4) a highly shrinkable polymer is used as a component of composite fibers, which will become latent crimpable fibers; and (5) the highly shrinkable fibers are used upon integral molding and three-dimensional molding.

The highly shrinkable fibers have been prepared by modifying, upon polymerization for the raw material polyester, its acid component by polymerizing isophthalic acid with terephthalic acid. This is considered to be because that this process of modifying the acid component is most advantageous in conducting separation and recovery of ethylene glycol component in the polymerization process. However, this acid component modifying process, requiring a high copolymerization ratio, has the disadvantage of deteriorating superior characteristics inherent to polyester.

Such being the case, not only the modification of acid component but also that of glycol component has been practiced in recent years. Among products obtained by the above processes, most common polyesters are those copolymerized with an alkylene oxide adduct of bisphenol A and those copolymerized with isophthalic acid and an alkylene oxide adduct of bisphenol A. These polyesters exhibit higher shrinkability with smaller copolymerization ratio as compared to those with modified acid component alone. Accordingly, this method is effective in obtaining high shrinkability and high shrinking stress while maintaining good properties inherent to polyester.

However, polyesters copolymerized with an alkylene oxide adduct of bisphenol A have the disadvantages of very poor lightfastness and colorfastness.

Another method for obtaining highly shrinkable polyester fibers comprises heat drawing polyester fibers at a low temperature, thereby decreasing the degree of crystallization of the polyester. This method can surely produce highly shrinkable polyester fibers, which, however, have low heat shrinking stress because of reduction in stress during dry heating. Consequently, the highly shrinkable effect cannot be exhibited in woven or knit fabrics utilizing mixed filament yarns combining less shrinkable fibers with such highly shrinkable fibers.

The present inventors have made an intensive study to obtain a fiber having excellent dyeability and deep color dyeability, as well as high shrinkability and shrinking stress. As a result, it was found that polyesters copolymerized with a compound having a specific chemical structure in a specific amount can provide fibers having sufficient dyeability, deep color dyeability and shrinking characteristics.

Polyesters copolymerized with the compound with the specific chemical structure in an amount of 50–100 mole % are disclosed in U.S. DEFENSIVE PUBLICATION T896033, but the polyester have been difficult to convert into fibers.

The present invention is based on the finding that copolyesters polymerized with the compound with a specific chemical structure in a specific amount are convertible into fibers, which have not only sufficient dyeability, deep color dyeability, high shrinkability and shrinking stress characteristics, but also superior lightfastness and colorfastness.

It is an object of the present invention to provide a polyester fiber or filament having not only excellent dyeability, deep color dyeability, high shrinkability and shrinking stress characteristics, but also excellent lightfastness and colorfastness.

Another object of the present invention is to provide a mixed filament yarn or sheath-core textured yarn comprising this polyester filament.

A further object of the present invention is to provide a blended spun yarn comprising as one component staple fibers comprising a polyester constituting the above polyester fiber.

A still further object of the present invention is to provide a composite fiber comprising as a component the polyester constituting the above polyester fiber.

DISCLOSURE OF THE INVENTION

The present invention provides a polyester fiber (hereinafter referred to as "PES fiber (II)" or "PES filament (II)") comprising a polyester (hereinafter referred to as PES (I)) containing 2 to 20 mole % of copolymerization component of a compound represented by the following structural formula (1)

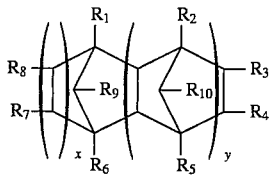

(1)

wherein $R_1$ through $R_{10}$ each represents a group selected from the group consisting of ester-forming functional groups, hydrogen atom and alkyl groups, one or two of $R_1$ through $R_{10}$ being ester-forming functional groups, x is 0 or 1, and y is an integer satisfying the following condition.

$$1 \leq x+y \leq 3$$

The present invention further provides a composite fiber comprising PES (I).

The present invention still further provides a mixed filament yarn with differently shrinkable filaments comprising the PES filament (II).

The present invention still further provides a sheath-core textured yarn comprising the PES filament (II).

The present invention still further provides a blended spun yarn comprising staple fibers comprising PES (I).

BEST MODE FOR CARRYING OUT THE INVENTION

In the compound represented by the structural formula (1) and contained in PES (I) constituting the PES fiber (II), examples of the ester-forming functional groups used are hydroxyl group, hydroxyalkyl groups, carboxyl group and ester-forming derivatives thereof. There is no limitation to the type of alkyl groups constituting the hydroxyalkyl groups, but they are preferably alkyl groups having 1 to 4 carbon atoms, such as hydroxymethyl, hydroxyethyl, hydroxypropyl and hydroxybutyl, including branched alkyl groups. Preferred examples of ester-forming derivatives of carboxyl group are carboxyalkyl groups with the alkyl having 1 to 4 carbon atoms, such as carboxymethyl, carboxyethyl, carboxypropyl and carboxybutyl.

It is necessary that the compound contain one or two ester-forming functional groups. The compound preferably has two groups thereof, since it is desirable that the compound be copolymerized in polyester molecular chains in view of obtaining high shrinking characteristics of the resulting polyester fibers and high polymerizability. The two functional groups may either be the same or different.

In the compound, the carbon atoms other than those bonded to ester-forming functional groups are bonded to hydrogen atom or alkyl groups, preferably hydrogen atom, which does not impair polymerizability. Examples of preferred alkyl groups are those having 1 to 5 carbon atoms, such as methyl, ethyl, propyl, butyl and pentyl, which groups may be branched.

Examples of the compound used in the present invention are norbornane-2,3-dimethanol, norbornane-2,3-diethanol, norbornane-2,3-dicarboxylic acid, norbornane-2,3-dicarboxylic dimethyl ester, norbornane-2,3-dicarboxylic diethyl ester, perhydrodimethanonaphthalenedimethanol, perhydrodimethanonaphthalenediethanol, perhydrodimethanonaphthalenedicarboxylic acid, perhydrodimethanonaphthalenedicarboxylic acid dimethyl ester, tricyclodecanedimethanol, tricyclodecanediethanol, tricyclodecanedicarboxylic acid, tricyclodecanedicarboxylic acid dimethyl ester and tricyclodecanedicarboxylic acid diethylesters. These compounds may have contain alkyl groups or other substituents, such as sulfonyl group, bonded to carbon atoms other than those bonded to ester-forming functional groups. Preferred among the above compounds are norbornane-2,3-dimethanol, norbornane-2,3-carboxylic acid, norbornane-2,3-dicarboxylic acid dimethyl ester, perhydrodimethanonaphthalenedimethanol, perhydrodimethanonaphthalenedicarboxylic acid, perhydrodimethanonaphthanledicarboxylic acid dimethyl ester, tricyclodecanedimethanol, tricyclodecanediethanol, tricyclodecanedicarboxylic acid and tricyclodecanedicarboxylic acid dimethyl ester, which give good polymerizability, spinnability, fiber strength and shrinking characteristics. Further in view of polymerizability, it is desirable to use norborane-2,3-dimethanol, norborane-2,3-dicarboxylic acid, norborane-2,3-dicarboxylic acid dimethyl ester, perhydrodimethanonaphthalenedimethanol, perhydrodimethanonaphthalenedicarboxylic acid and perhydrodimethanonaphthalenedicarboxylic acid dimethyl ester, all having the two ester-forming functional groups at the trans positions.

The polyesters used in the present invention have a principal dicarboxylic acid component of terephthalic acid and a principal glycol component of at least one alkylene glycol selected from the group consisting of ethylene glycol, trimethylene glycol and tetramethylene glycol. The polyesters may be further copolymerized with a third component other than the compound represented by the structural formula (1) within a limit not to impair the purpose of the present invention.

Examples of the third component are aromatic dicarboxylic acid, e.g. isophthalic acid, phthalic acid, naphthalenedicarboxylic acid, biphenyldicarboxylic acid, 4,4'-diphenyl ether dicarboxylic acid, 4,4'-diphenylmethane dicarboxylic acid, 4,4'-diphenylsulfonedicarboxylic acid, 4,4'-diphenyl-isopropylidenedicarboxylic acid, 1,2-diphenoxy-ethane-4'4"-dicarboxylic acid, anthracenedicarboxylic acid, 2,5-pyridinedicarboxylic acid, diphenoxyketonedicarboxylic acid, sodium 5-sulfoisophthalate, sodium dimethyl-5-sulfoisophthalate and 5-tetrabutylphosphoniumsulfoisophthalic acid; aliphatic dicarboxylic acids, e.g. malonic acid, succinic acid, adipic acid, azelaic acid and sebacic acid; alicyclic dicarboxylic acids, e.g. decalindicarboxylic acid and cyclohexanedicarboxylic acid; hydroxycarboxylic acids, e.g. β-hydroxyethoxybenzoic acid, p-oxybenzoic acid, hydroxypropionic acid and hydroxyacrylic acid; carboxylic acids derived from ester-forming derivatives of the foregoing; aliphatic lactones, e.g. ε-caprolactone; aliphatic diols, e.g. hexamethylene glycol, neopentyl glycol, diethylene glycol and polyethylene glycol; aromatic diols, e.g. hydroquinone, catechol, naphthalene diol, resorcin, bisphenol A, bisphenol A ethylene oxide adducts, bisphenol S and bisphenol S ethylene oxide adducts; and aliphatic diols, e.g. cyclohexanedimethanol. These third components may be copolymerized singly or in combination of two or more.

The PES (I) used in the present invention may further be copolymerized with a multifunctional carboxylic acid such as trimellitic acid, trimesic acid, pyromellitic acid or tricarballylic acid, or polyhydric alcohols such as glycerin, trimethylolethane, trimethylolpropane or pentaerythritol, as long as the resulting polyester is substantially linear.

The content of the compound represented by structural formula (1) is in the range of 2 to 20 mole % based on the dicarboxylic component constituting the polyester, preferably 3 to 18 mole %. If the content is less than 2 mole %, the resulting polyester will not give the intended highly shrinkable fiber of the invention, because of insufficient decrease in the degree of crystallinity of the polyester. If the content exceeds 20 mole %, the polymerizability will decrease and the resulting polyester will tend to be of low crystallinity. In this case, if a polyester with satisfactory crystallinity is obtained at all, it has a low melting point, thereby giving fibers having unsatisfactory heat resistance.

With increasing content of the compound, the degree of crystallinity and melting point of the polyester decrease but the shrinkage ratio of the resulting polyester fibers increases. Accordingly, the content of the compound is suitably so selected as to meet the required heat resistance, shrinking characteristics and dyeability to each end-use, within the range specified in the present invention.

The polyesters used in the present invention can be obtained by any conventional polymerization process. For example, there may be employed a process which comprises a first step of carrying out direct esterification of terephthalic acid and an alkylene glycol, transesterification of a lower alkyl ester of terephthalic acid such as dimethyl terephthalate and an alkylene glycol, or reaction of terephthalic acid with an alkylene oxide, to form an alkylene glycol ester of terephthalic acid and/or its oligomers and a second step of polycondensing the reaction product of the first step to a desired degree of polymerization, with a polymerization catalyst such as antimony trioxide, germanium oxide or tetralkoxyethane at a temperature of 230° to 300° C. under reduced pressure. In the above cases, the compound represented by structural formula (1) can be added in a prescribed amount at any step until the end of polycondensation reaction, for example added to the starting materials for the polyester or at a period after the transesterification and before the polycondensation.

It is also possible, in order to increase the degree of polymerization, to effect polymerization at first in the liquid phase and then conduct solid phase polymerization.

The PES (I) used in the present invention preferably has an intrinsic viscosity (determined at 30° C. in a 50/50 by weight mixed solvent of phenol/tetrachloroethane) of 0.4 to 1.5. If the intrinsic viscosity of the PES (I) is less than 0.4, the resulting fiber will have too poor strength and shrinking characteristics to achieve the object of the present invention. On the other hand, i.e. the intrinsic viscosity of the PES (I) exceeds 1.5, the polyester will have too high a melt viscosity, thereby deteriorating fiber formability, such as spinnability and drawability.

The PES (I) used in the invention may, as required, incorporate additives such as antioxidants, UV absorbers, fluorescent whitening agents, delustering agents, antistatic agents, flame-retardants, auxiliary flame retardants, lubricants, colorants, plasticizers and inorganic fillers, within limits not to impair the purpose of the invention.

The PES fiber (II) of the present invention can be obtained by the usual melt spinning. The obtained as-spun filaments are drawn in the usual manner, i.e. under drawing conditions generally employed for conventional polyester fibers. Thus, the as-spun filaments are preheated through hot rolls, and heat drawn at a draw ratio conforming to the speed of take-up roll. Instead, there may be employed spin-drawing which connects spinning directly with heat drawing.

The PES fiber (II) may have any cross-sectional shape such as circular, multi-lobal including 3 to 8-lobal, T-shaped, V-shaped, flat or square. The PES fiber (II) may not necessarily be solid, but may be hollow or porous. There is no particular limitation to the size (fineness) of the PES fiber (II), and it may have any-optional fineness according to the intended use. The PES fiber (II) may have a fineness unevenness along the fiber axis.

The PES fiber (II) can be used not only in the form of filament yarns but in the form of staple fibers.

The PES fiber (II) has a birefringence Δ n satisfying the following condition (2).

$$-5.55 \times A + 80 \leq \Delta n \times 10^3 \leq -5.55 \times A + 165 \quad (2)$$

wherein A is the content of the compound represented by structural formula (1) in mole %.

The value of birefringence Δ n being in the above range realizes the excellent dyeability and deep color dyeability of the polyester fibers when dyed.

Incorporation of the compound represented by structural formula (1) into molecular chains of polyester makes the aliphatic cyclic skeleton of the compound be positioned on the side chains of the molecular chains. Due to this conformation, even a small content of the compound can increase the degree of amorphous state, suppress the decrease of the second-order transition temperature and accumulate stress generating upon relaxation of the resulting fiber when it shrinks by heat. As a result, the fiber becomes highly shrinkable and, at the same time, has excellent heat resistance, colorfastness and lightfastness. The lightfastness herein can be expressed in terms of that against carbon arc light, and the above PES fiber (II) is ranked at at least class 4. There is no limitation to dyeing conditions employed for the fiber and all disperse dyes, cationic dyes and acidic dyes are usable for providing any shade ranging from light to dark.

The PES fibers (II) of the present invention can be provided not only with high shrinkage ratios but high shrinking stress by properly adjusting drawing conditions.

Generally speaking, highly shrinkable fibers show a low shrinking stress. However, the polyester fibers of the present invention have, when drawn under specific conditions, both a high shrinkage ratio and a high shrinking stress.

That is, the polyester as-spun filaments produced by the usual melt spinning process are, after being once taken up or directly, drawn with heating. It is desirable to preheat the as-spun filaments at a temperature of around 75° to 95° C. through hot rolls, before feeding to a drawing zone. Then, the preheated filaments are drawn at a temperature of 150° C. or less, preferably 140° C. or less at a draw ratio of at least 0.68 time, preferably at least 0.7 time the maximum draw ratio at breakage. If the drawing temperature exceeds 150° C., the shrinkage ratio of the resulting filaments will decrease. If the draw ratio is less than 0.68 time the maximum draw ratio, the resulting filaments will have insufficient heat shrinking stress and too large a remaining elongation and hence become hard to form into clothing.

The thus obtained drawn polyester filaments (hereinafter referred to as "drawn PES fibers (III)" or "drawn PES filaments (III)") have a high shrinkage ratio and high shrinking stress, i.e. a dry heat shrinkage ratio at 180° C. of at least 20%, a dry heat maximum shrinking stress of at least 250 mg/denier and a wet heat shrinkage ratio at 98° C. of at least 15%. The filaments satisfying the above three conditions of dry heat shrinkage ratio, dry heat maximum shrinking stress and wet heat shrinkage ratio at the same time give, when used as core yarn of sheath-core textured yarns or as a component of mixed filament yarns with differently shrinkable filaments as described later herein, woven or knit fabrics having a good hand. These fabrics can, after post-treatment, be provided with an appropriate HARI (anti-drape stiffness), KOSHI (stiffness) and bulk.

If the drawn PES filaments (III) having a dry heat shrinkage ratio of less than 20% are used as core filaments of sheath-core textured yarns as described later, woven or knitted fabrics prepared therefrom will tend to be insufficient in bulkiness because of the insufficient shrinkage of the drawn PES filaments (III). Although there is no limitation to the upper limit of dry heat shrinkage ratio, it is preferably less than 80%, more preferably in the range of 20 to 75% in view of degradation of fiber properties.

With the drawn PES filaments (III) having a wet heat shrinkage ratio at 98° C. of less than 15%, the difference between the dry heat shrinkage ratio and wet heat shrinkage ratio is too large. Woven or knit fabrics utilizing such filaments will tend to have poor dimensional stability and dimensional uniformity because the drawn PES filaments (III) shrink too much during processing, for example dry heat treatment such as heat setting after hot water treatment, dyeing or like wet heat treatments. Although there is no particular limitation to the upper limit of the wet heat shrinkage ratio, it is preferably 75% or less, more preferably in the range of 15 to 70%, in view of physical properties, especially collapsing tendency of finished woven or knit fabrics. There is no limitation to the difference between dry heat shrinkage ratio and wet heat shrinkage ratio either, but it is preferably in the range of 1 to 30% because of the same reasons as described above.

Ease of shrinking of fibers or woven and knit fabrics under restrained conditions depends on the shrinking stress of the fibers constituting the fabrics. The larger the shrinking stress of the fibers, the more easily the shrinkage occurs even under restrained conditions. The fibers having a dry heat maximum shrinking stress of at least 250 mg/denier can shrink sufficiently even under restrained conditions.

The drawn PES filaments (III) can be used for mixed filament yarns with differently shrinkable filaments and sheath-core textured yarns.

Firstly, the application to the mixed filament yarns is explained.

Conventional mixed filament yarns with differently shrinkable filaments comprising differently shrinkable polyethylene terephthalate filaments are used for preparing woven and knit silk-like fabrics with soft hand and drape to be used principally for women's dresses and blouses. These mixed filament yarns have been produced by mixing drawn yarns having different boiling water shrinkage ratios, or by drawing undrawn yarns having the same physical properties under different heating conditions, followed by mixing thereof. However, with these processes, simply mixing filaments having different boiling water shrinkage ratios, the original shrinkage difference decreases through heat history ending at weaving or knitting. Besides, the resulting woven or knit fabrics have poor hand, because of a small stress accumulated due to the heat shrinkage difference under their restrained conditions.

Where the drawn PES filaments (III) are applied as highly shrinkable filaments for these conventional mixed filament yarns with differently shrinkable filaments, the above problems are solved and, further, there can be obtained the practical advantage of excellent lightfastness.

The mixed filament yarns with differently shrinkable filaments according to the present invention comprise a highly shrinkable filament group of the above drawn RES filaments (III) and a less shrinkable filament group of filaments having a smaller shrinkage ratio as compared to the drawn PES filaments (III), the two groups having been mixed together by entangling or mixed spinning. It is desirable that the difference between the wet heat shrinkage ratio at 98° C. (hereinafter simply referred to as "wet heat shrink ratio") of the high shrinkable filament group and that of the less shrinkable filament groups be at least 8%. If the wet heat shrinkage ratio difference is less than 8%, woven or knit fabrics comprising the mixed yarn will hardly exhibit sufficient heat shrinking behavior. That is, in order to form a specific structure, after a woven or knit fabric has been made, where highly shrinkable filaments are positioned at the core part and less shrinkable filaments at the sheath, paying attention only to the wet heat shrinkage ratio difference as the measure is not sufficient. The synergetic effect produced by the difference in wet heat shrinkage ratio between the highly shrinkable filaments and less shrinkable filaments, together with the maximum dry heat shrinking stress of the highly shrinkable filaments, can realize a sufficient heat shrinking behavior of the woven or knit fabrics during post-treatment processes, whereby excellent hand including HARI, KOSHI and bulky feeling can be obtained.

To achieve a sufficient heat shrinking behavior for woven or knit fabrics during post-treatment processes, it is desirable that the difference in wet heat shrinkage ratio between highly shrinkable filaments and less shrinkable fibers be in the range of 8 to 60%, preferably 10 to 55%.

It is also desirable that these mixed filament yarns with differently shrinkable filaments have, by themselves, a wet heat shrinkage ratio of 10 to 55%, particularly 10 to 50%. If the wet heat shrinkage ratio of the mixed yarn is less than 10%, finished woven or knit fabrics will have insufficient hand, such as HARI, KOSHI and bulky feeling. On the other hand, if the wet heat shrinkage ratio exceeds 55%, the mixed filament yarns will tend to have poor heat stability.

It is further desirable that filaments constituting the highly shrinkable filament group of the mixed filament yarns, i.e. the drawn PES filaments (III), have a fineness of 1 to 10 deniers and those of the less shrinkable filament group have a fineness of not more than 5 denier, and that the weight ratio between the highly shrinkable filament group and the less shrinkable filament group be in the range of 2:1 to 1:5, in order to obtain a good hand of the resulting woven or knit fabrics. There is no specific limitation to the type of the polymer constituting the less shrinkable filament group, and any one of polyester, rayon, polyamide and like filaments, having a wet heat shrinkage ratio of at least 8% smaller than that of the drawn PES filaments (III) can be used.

With the mixed filament yarns, the difference in the filament length between the drawn PES filaments (III) and less shrinkable filaments are preferably at least 4%. If the difference is less than 4%, woven or knit fabrics utilizing the mixed filament yarns will lack a good hand, such as bulky feeling and softness. The upper end of the difference is not particularly limited, but it is preferably not more than 30% and may be adjusted according to the intended use.

The mixed filament yarns can be produced by the usual mixed spinning, mixed drawing, air jet entangling or like processes, and can further be subjected to an air entanglement process such as interlacing or Taslan texturing, which improves the stable runnability 5 the yarns during processing, weaving or knitting. The mixed filament yarns may have loops or fluffs.

Next, the application of the drawn PES filaments (III) to sheath-core textured yarns is described.

The use of the drawn PES filaments (III) as the core part of a sheath-core textured yarn makes it a soft "spun-like" textured yarn having an excellent hand. With this type of sheath-core textured yarn, it is desirable that filament entanglements be further formed by air entangling at specific intervals along the yarn direction, in order to obtain a good bulkiness upon false-twisting and a good unwindability after false twisting. The core and sheath filaments are held together, to give a soft textured yarn having a superior soft hand. The air entanglement may be applied either before or alter false twisting, according to the intended purpose. The false twisting is desirably carried out at a temperature below the melting point of low melting filaments. The false twisting number T can be the same as that of conventional polyester textured yarns and is preferably in the range determined by the following formula.

$$T = T_0 \{150/[D \times (R^1/R^2)]\}^{1/2}$$

$$R^1/R^2 = k \cdot r$$

wherein $1200 \leq T_0 2800$, and $0.9 \leq k \leq 1.4$, $R^1$ represents the speed of feed roll for feed yarn and $R^2$ that of delivery roll, r is the speed ratio between $R^1$ and $R^2$ generally employed for manufacturing bulky yarns, and D the fineness (deniers) of feed yarn.

The finenesses of sheath and core yarns should be selected according to the intended use but, generally, the fineness of sheath yarn is preferably larger or equal to that of core yarn. The sheath yarn used preferably comprises a polyester, which may by modified. It is also possible to use for this purpose a composite fiber comprising a polyester and a polyamide.

The PES (I) of the present invention can be used for producing composite fibers and blended spun yarns.

Firstly, the use for composite yarns is described.

The PES (I) can, while being combined with other fiber-forming polymers, be formed into composite fibers, which are then drawn under the drawing conditions as described above. Then, the resulting fibers may, depending on the composite configuration, develop self-crimpability due to the difference in the shrinkability of two components; develop fine wrinkles on the fiber surface formed by the other fiber-forming polymer due to the high shrinkability of the PES (I); or develop efficient delamination due to the large shrinkage difference. Accordingly, the composite fibers can provide fabrics having excellent features similar to natural fibers, such as good elasticity, HARI, KOSHI, bulk, slippery nature, flexibility and softness.

Examples of composite configurations are side-by-side, sheath-core, eccentric sheath-core, multilayer laminate and radial. Any one of these configurations may be suitably selected according to the intended use, as long as it enables the PES (I) to exhibit high shinkability.

Conventional crimpable composite fibers are of side-by-side or eccentric sheath-core type and comprise components of polyethylene terephthalates with different degrees of polymerization, polyethylene terephthalate and polybutylene terephthalate, a polyester copolymerized with isophthalaic acid and a polyethylene oxide adducts of bisphenol A and polyethylene terephthalate, and like combinations. However, these conventional composite fibers are insufficient in shrinking characteristics or, if they have satisfactory shrinkability at all, insufficient in lightfastness. Composite fibers comprising the PES (I) and other fiber-forming polymers have solved the problem of insufficient colorfastness, and have sufficient shrinking characteristics. Nonwoven fabrics comprising these composite fibers are useful, utilizing the good shrinking characteristics.

Application to blended spun yarns is described now.

Staple fibers of the drawn PES fibers (III) and other synthetic fibers and/or natural fibers are blend-spun by the usual process into blended yarns. Woven or knit fabrics comprising the blended yarns produce, upon heat treatment, a good bulk, since the staple of the drawn PES fibers (III) shrink sufficiently even under restraint of woven or knit construction. These woven or knit fabrics also show excellent lightfastness as compared to conventional products, and are hence very useful for practical purposes.

There is no specific limitations to the fineness, cut length, twist number and blend ratio of the drawn PES fibers (III) and the other synthetic and/or natural fibers used for this purpose, and these factors can appropriately set according to the intended use.

While composite fibers, mixed filament yarns, sheath-core textured yarns and blended spun yarns utilizing the PES (I), PES fibers (II) and drawn PES fibers (III) have been described, the present invention also includes woven and knit fabrics utilizing these polymer and fibers.

Examples of such fabrics include woven, knit and nonwoven fabrics and pile fabrics using the drawn PES fibers (III) as the ground yarns or pile yarns. These fabrics preferably contain the drawn PES fibers (III), composite fibers, mixed filament yarns, blended spun yarns or sheath-core textured yarns in an amount of at least 20% by weight, more preferably at least 30%. If the content is less than 20% by weight, the fibers of the present invention will shrink only insufficiently under restraint of woven or knit construction, thereby failing to provide desired products. Even if the desired products are obtained at all, they are insufficient in HARI, KOSHI, resilience or bulk, or have so poor dimensional stability that they will be elongated or collapsed when put under external forces.

The fabrics, containing the highly shrinkable fibers, no longer suffer from problems inherent to conventional fabrics of similar construction, such as poor hand and insufficient lightfastness. Pile fabrics containing the shrinkable fibers can be provided with high density and high bulkiness.

The present invention will be described in further detail with reference to the following examples.

In the Examples, Comparative Examples and Reference Examples that follow, various properties were determined according to the methods given below.

[Content of the compound represented by formula (1) (mole %)]

Calculated from the results of $^1$H-NMR spectroscopy on a polyester sample dissolved in deuterated trifluoroacetic acid.

[Intrinsic viscosity of polyester (dl/g)]

Determined by measurement in a 1/1 by weight mixed solvent of phenol/tetrachloroethane at 30° C.

[Melting point (°C.), glass transition temperature (°C.) and degree of crystallinity (J/g)]

A differential scanning calorimeter (Mettler TA 3000 type, manufactured by Perkin-Elmer Inc.) is used. A 10-mg sample is tested at a temperature elevation and decreasing rates of both 10° C./min., while the air in the apparatus is replaced by nitrogen. The same sample is subjected to this procedure twice and the data obtained by the second measurement is taken as the observed values. Separately, a sample is heat treated to crystallize sufficiently and then tested with the same apparatus, to obtain a heat of fusion of crystal (J/g), which is taken as an index of the degree of crystallinity.

[Birefringence of polyester fiber]

Measured in a -bromonaphthalene, with sodium vapor light source and under a polarized microscope, with a Berek compensator inserted into the light passage.

[Dry heat shrinkage ratio of polyester fiber (Dsr, %)]

A filament specimen is marked for a length of 50 cm under an initial load of 1 mg/denier (hereinafter "denier" is sometimes expressed as "d"). The specimen is allowed to stand for 10 minutes under a load of 5 mg/d in a dry heat atmosphere at 180° C., and then taken out and measured for the distance, L cm, between the marks under a load of 1 mg/d. The dry heat shrinkage ratio is calculated by:

Dry heat shrinkage ratio (Dsr, %)=[(50−L)/50]×100

[Dry heat shrinking stress of polyester fiber (mg/d)]

A 20-cm test filament sample is mounted on a tensile tester (Autograph) and, after application of an initial load of 50 mg/d, heated at a temperature elevation rate of ° C./min. The shrinking force developed during this heating is measured.

[Wet heat shrinkage ratio of polyester fiber (Wsr, %)]

A filament specimen is marked for a 50-cm length under an initial load of 1 mg/d. Then the specimen is immersed in hot water at 98° C. for 30 minutes under a load of 5 mg/d. The specimen is taken out from hot water and the distance, L' cm, between the marks is measured. The wet shrinkage ratio is calculated by:

Wet heat shrinkage ratio (Wsr, %)=[(50−L')/50]×100

[Wet heat shrinkage ratio of mixed filament yarn (Wsr, %)]

Determined in the same manner as for the above wet heat shrinkage ratio of polyester fiber.

[Difference in wet shrinkage ratio between filament groups constituting mixed filament yarn (ΔW, %)]

A mixed filament yarn sample is separated into constituting filament groups, which are then each tested for the wet shrinkage ratio according to the above method. The difference between the obtained values is calculated.

[Difference in fiber length of filament groups constituting mixed filament yarn (1, %)]

A mixed filament yarn sample is marked for a 50-cm length and then separated into composing filament groups. The groups are each measured for the distance, $l_1$ and $l_2$, under a load of 1 mg/d. The difference between $l_1$ and $l_2$ is calculated.

[Lightfastness]

A fabric sample is dyed under the following conditions and the dyed sample is tested for lightfastness according to JIS L0842-1988.

| Dyeing | |
|---|---|
| Dye: Sumikaron Red S-BL (manufactured by Sumitomo Chemical Co., Ltd.) | 0.1 or 3.0% |
| Dispersing agent: Disper TL (manufactured by Meisei Kagaku K.K.) | 1 g/l |
| pH regulator: acetic acid | 0.5 cc/l |
| Dyeing time: | 60 min |
| Dyeing temperature: | 130° C. |
| Bath ratio: | 1:50 |
| Alkali reduction cleaning | |
| Sodium hydroxide: | 1 g/l |
| Amylazin (Dai-ichi Kogyo Seiyaku Co., Ltd.): | 1 g/l |
| Hydrosulfite: | 1 g/l |
| Cleaning time: | 20 min |
| Cleaning temperature: | 80° C. |
| Bath ratio: | 1:50 |

[Color depth of dyed fabric (K/S)]

A dyed fabric sample, having been dyed under the above conditions with a dye concentration of 3.0%, is tested for spectral reflectance (R) with a color analyzer (an automatic recording spectrophotometer manufactured by Hitachi Ltd.). The color depth is obtained by the following Kubelka-Munk formula. A larger K/S value means a deeper color.

$$K/S=(1-R)^2/2R$$

wherein R is the spectral reflectance at the maximum absorption wave length on the reflectance curve in the visual light range.

[Evaluation of fabric hand and elasticity]

The hand as represented by bulk, softness, HARI, KOSHI and scrooping feeling, and elasticity of a fabric sample is organoleptically evaluated by pair comparison method.

Reference Example A

A slurry was prepared from a mixed diol of 4.2 mole % of norbornane-2,3-dimethanol (a compound as shown in Table 1) and 95.8 mole % of ethylene glycol, and terephthalic acid in a molar ratio between the diol and terephthalic acid of 1.2:1. The slurry was subjected to esterification under pressure (absolute pressure: 2.5 kg/cm$^2$) at 250° C. to a conversion of 95%, to give a low-polymerization-degree product. Then, 350 ppm of antimony trioxide as a catalyst was added to the product, and polycondensation was effected under a reduced pressure of 1 torr (absolute pressure) at 280° C. for 1.5 hours, to obtain a polyester having an intrinsic viscosity of 0.70 dl/g. The obtained polyester was extruded through nozzles into strands, which were then cut into cylindrical chips having a diameter of 2.8 mm and a length of 3.2 mm.

The obtained polyester chips were analyzed by NMR spectroscopy, to prove to be a polyester having as a copolymerization component norbornane-2,3-dimethanol in an amount of 5 mole % based on the total dicarboxylic acid component. The polyester chip was found to have a Tg (glass transition temperature) of 78° C., a Tm (melting point) of 241° C. and a heat of fusion of crystal after crystallization treatment of 36 J/g.

Reference Examples B through Q

Reference Example A was repeated except that each of the compounds shown in Table 1 was used in a copolymerization amount as shown, to obtain groups of polyester chips. The Tg, Tm and heat of fusion of crystal of each of the obtained polyesters were measured and shown in Table 1.

Reference Examples a through q

Reference Example A was repeated except that a polyethylene terephthalate having an intrinsic viscosity of 0.70 dl/g (Reference Example a) and compounds as shown in Tables 2 and 3 were each used in a copolymerization amount as shown, to obtain a series of polyester chips. Each of the polyester was tested for intrinsic viscosity, Tg, Tm and heat of fusion of crystal. The results are shown in Tables 2 and 3.

EXAMPLE 1

The polyester chips obtained in Reference Example A were melted in a extruder and extruded at 290° C. through a spinneret with 24 holes having a diameter of 0.25 mm, and the extruded filaments were taken up at a speed of 1,000 m/min. The obtained polyester yarn was drawn through a hot roll at 85° C. and a hot plate at 100° C. (Example 1—1) or 120° C. (Example 1-2) at a speed of 500 m/min., to give multifilament yarns of 75 denlet/24 filaments. The draw ratios were both 3.20, which was 0.75 time the maximum draw ratio at break.

The properties of the obtained multifilament yarns were shown in Table 4.

The filament yarns comprising the polyester copolymerized with norbornane-2,3-dimethanol in a specific amount had a high dry heat shrinkage ratio and wet heat shrinkage ratio, as well as high dry heat shrinking stress.

Pile knit fabrics were prepared using these multifilament yarns as ground yarn, and it was found that the pile knit fabrics had a high pile density with high quality surface appearance. These pile knit fabrics were dyed under the aforementioned conditions, to yield colored knit fabrics having a low birefringence and good color depth due thereto, as well as a high colorfastness of class 5.

COMPARATIVE EXAMPLE 1

Example 1 was repeated except that the polyethylene terephthalate obtained in Reference Example a, to obtain multifilament yarns of 75 denier/24 filaments.

The properties of the multifilament yarns obtained were measured and are shown in Table 5.

The multifilament yarns showed a dry heat shrinking stress of the same level as that oE the yarns obtained in Example 1, but had a markedly small dry heat shrinkage ratio and wet heat shrinkage ratio.

Pile knit fabric were prepared using each of the multifilament yarns as ground yarn, and it was found that the pile knit fabrics had a small pile density, thus lacking high quality appearance. The pile knit fabrics were dyed in the same manner as in Example 1. The dyed fabrics had a high lightfastness of class 5, but had a high birefringence and low color depth.

EXAMPLES 2 THROUGH 17

Multifilament yarns of 75 denier/24 filaments were prepared in the same manner as in Example 1, except for using the polyester chips obtained in Reference Examples B through Q. The properties of the obtained multifilament yarns are shown in Table 4. The multifilament yarns, while having a high heat shrinking stress of the same level as those of the yarns obtained in Comparative Example 1, still had a high dry heat shrinkage ratio and wet heat shrinkage ratio. Pile knit fabrics were prepared using the obtained multifilament yarns as ground yarn, and then dyed, in the same manner as in Example 1. The dyed fabrics showed a high color depth thanks to low birefringence and had sufficient lightfastness, thus proving of high practical utility.

COMPARATIVE EXAMPLES 2 THROUGH 7

Multifilament yarns of 75 denier/24 filaments were prepared in the same manner as in Example 1, except for using the polyester chips obtained in Reference Examples a through g. The properties of the obtained multifilament yarns are shown in Table 5. Although the multifilament yarns had a high heat shrinking stress of the same degree as that of the yarns obtained in Comparative Example 1, they showed a low dry heat shrinkage ratio and wet heat shrinkage ratio. The pile fabrics using the yarns as ground yarn had a small pile density, thus lacking high quality appearance.

COMPARATIVE EXAMPLES 8 THROUGH 13

Attempts were made to use the polyester chips obtained in Reference Examples h through m and conduct spinning and drawing in the same manner as in Example 1. However, satisfactory drawn yarns could not be obtained due to frequent yarn breakages during drawing because of the amorphous nature of the polyesters.

COMPARATIVE EXAMPLE 14

Multifilament yarns of 75 denlet/24 filaments were prepared in the same manner as in Example 1, except for using the polyester chips obtained in Reference Example n. The properties of the obtained multifilament yarns are shown in Table 5. Although the multifilament yarns had a dry heat shrinkage ratio and wet heat shrinkage ratio of the same level as those of the yarns obtained in Examples, they showed a very low dry heat shrinking stress. The pile fabrics using the yarns as ground yarn, with which a sufficient shrinkage could not be obtained due to the low shrinking stress, had a small pile density, thus lacking high quality appearance.

COMPARATIVE EXAMPLES 15 THROUGH 17

Multifilament yarns of 75 denier/24 filaments were prepared in the same manner as in Example 1, except for using the polyester chips obtained in Reference Examples o through q. The properties of the obtained multifilament yarns are shown in Table 5. Although the multifilament yarns had a dry heat shrinkage ratio, dry heat shrinking stress and wet heat shrinkage ratio all of the same level as those of the yarns obtained in Examples, they showed, when formed into a knit fabric and dyed in the same manner as in Example 1, a low lightfastness of 1–2 class, thus proving to be of no practical utility.

EXAMPLE 18

A mixed filament yarn with 2 units/inch of entanglements was prepared with a fluid entangling apparatus under an air pressure of 5 kg/cm$^2$, using the multifilament yarn obtained in Example 1—1 as a highly shrinkable filament group and the multifilament yarn obtained in Comparative Example 1—2 as a less shrinkable filament group. The difference ($\Delta W$, %) in wet heat shrinkage ratio between the two filament groups constituting the mixed yarn was found to be 15%, and the wet heat shrinkage ratio (Wsr', %) and filament length difference of the mixed yarn were 20% and 10%, respectively.

The mixed yarn thus obtained was twisted to 300 T/m, and the twisted yarn was used as both warps and wefts, to weave a fabric, which was dyed and finished by the usual processes to give a twill fabric.

The twill fabric thus obtained was organoleptically evaluated, to prove to have an excellent hand, as evaluated in terms of bulk, softness, HARI, KOSHI and cripsiness. The fabric also had good color depth and lightfastness.

COMPARATIVE EXAMPLE 18

Example 18 was repeated except that the multifilament yarn obtained in Comparative Example 2—1 was used as a highly shrinkable filament group, to prepare a mixed filament yarn. The difference ($\Delta W$, %) in wet heat shrinkage ratio between the two filament groups constituting the mixed yarn was found to be 4%, and the wet heat shrinkage ratio (Wsr', %) and filament length difference of the mixed yarn were 12% and 2%, respectively.

The mixed filament yarn was twisted to 300 T/m, and the twisted yarn was used as both warps and wefts, to weave a fabric, which was dyed and finished to give a twill fabric.

The twill fabric thus obtained was organoleptically evaluated, to prove to have poor hand, lacking bulky feeling and softness.

COMPARATIVE EXAMPLE 19

Example 18 was repeated except that the multifilament yarn obtained in Comparative Example 16—1 was used as a highly shrinkable filament group, to prepare a mixed filament yarn. The difference ($\Delta W$, %) in wet heat shrinkage ratio between the two filament groups constituting the mixed yarn was found to be 4%, and the wet heat shrinkage ratio (Wsr', %) and filament length difference of the mixed yarn were 12% and 2%, respectively.

The mixed filament yarn was twisted to 300 T/m, and the twisted yarn was used as both warps and wefts, to weave a fabric, which was dyed and finished by the usual processes, to give a twill fabric.

The twill fabric thus obtained was organoleptically evaluated, to prove to have poor hand, lacking bulky feeling and softness.

EXAMPLE 19

A sheath-core textured yarn was prepared by combining a highly shrinkable filament group of the multifilament yarn obtained in Example 1—1 and a less shrinkable filament group of the multifilament yarn obtained in Comparative Example 1—2, then providing the combined yarn with 2 units/inch of entanglements with a fluid processor under an air pressure of 5 kg/cm$^2$, and false twisting the yarn to a twist number of 2,000 T/m at a temperature of 180° C.

The textured yarn thus obtained was twisted to 300 T/m, and the twisted yarn was used as both warps and wefts, to weave a fabric, which was then dyed and finished by the usual processes to give a twill fabric. The difference in filament length between the core yarn and sheath yarn of the sheath-core textured yarn constituting the fabric was 8%.

The twill fabric thus obtained was organoleptically evaluated, to prove to have excellent hand, as evaluated in terms of bulk, softness, HARI, KOSHI and cripsiness. The fabric also had good color depth and lightfastness.

COMPARATIVE EXAMPLE 20

Example 19 was repeated except that the multifilament yarn obtained in Comparative Example 2—1 was used as a highly shrinkable filament group and that the false twisting temperature was changed to 200° C., to obtain a sheath-core textured yarn.

The textured yarn thus obtained was woven into a twill fabric in the same manner as in Example 19. The difference in filament length between the core yarn and sheath yarn of the sheath-core textured yarn constituting the fabric was 2%. Due to this small difference of 2%, i.e. the small shrinkage ratio of the multifilament yarn used as the highly shrinkable filament group, the fabric had a poor hand.

COMPARATIVE EXAMPLE 21

Example 19 was repeated except that the multifilament yarn obtained in Comparative Example 16—1 was used as a highly shrinkable filament group and that the false twisting temperature was changed to 200° C., to obtain a sheath-core textured yarn.

The textured yarn thus obtained was woven into a twill fabric in the same manner as in Example 19. The difference in filament length between the core yarn and sheath yarn of the sheath-core textured yarn constituting the fabric was 7%.

Although the hand of the fabric was as good as that in Example 19, the lightfastness was a very poor class 1—2.

EXAMPLE 20

Composite melt spinning was conducted with the polyester chips obtained in Reference Example A and those obtained in Reference Example a in such a manner as to form a side-by-side configuration, to obtain as-spun filaments. The as-spun filaments were then drawn in the same manner as in Example 1, to give a composite multifilament yarn of 75 denier/24 filaments.

The composite multifilament yarn thus obtained was twisted to 300 T/m, and the twisted yarn was used as both warps and wefts, to weave a fabric, which was then dyed and finished by the usual processes, to give a twill fabric.

The composite multifilament yarns constituting the obtained fabric had developed very fine spiral crimps during the finishing processes due to the difference in shrinkage ratio of the polyesters constituting the filaments. The obtained fabric had a moderate elasticity and a similar bulk, HARI, KOSHI and resilience to those of woolen fabric. Further the obtained fabric was excellent in color depth and had sufficient lightfastness for practical use.

Separately, the above side-by-side composite filament yarns were cut into staple fibers having a length of 51 mm, which were then formed into a nonwoven fabric. The nonwoven fabric had a good elasticity with the constituting fibers being crimped due to heating during processing. The nonwoven fabric showed, when dyed, excellent color depth and lightfastness.

COMPARATIVE EXAMPLE 22

A composite multifilament yarn was prepared by following the same procedure as in Example 20 except that the polyester chips obtained in Reference Example b were used instead of those obtained in Reference Example A. A twill fabric was prepared from the composite multifilament yarn in the same manner as in Example 20, and organoleptically evaluated in the same manner.

The obtained fabric, with the constituting filaments having developed fine crimps only to a small extent due to the small difference in the shrinkage ratio between the polyesters, lacked elasticity, bulki HARI, KOSHI and resilience.

COMPARATIVE EXAMPLE 23

A composite multifilament yarn was prepared by following the same procedure as in Example 20 except that the polyester chips obtained in Reference Example p were used instead of those obtained in Reference Example A. A twill fabric was prepared from the composite multifilament yarn in the same manner as in Example 20, and organoleptically evaluated in the same manner.

Although the obtained fabric had a good elasticity and hand, it showed a very poor lightfastness of class 1 to 2.

EXAMPLE 21

A blended spun yarn was prepared by blending the staple fibers obtained by cutting the composite filaments obtained in Example 20 to 50 mm and polyethylene terephthalate staple fibers having a fineness of 1 denier and a cut length of 51 mm, in a ratio by weight of 50:50. The blended yarn was used as both warps and wefts, to weave a fabric, which was then dyed and finished by the usual processes, to give a twill fabric.

The obtained fabric, with the constituting composite fibers having developed fine crimps caused by heating during processing, had a moderate elasticity. The polyethylene terephthalate staple fibers were positioned as loops and fluffs on the fabric surface, whereby the fabric showed a similar bulk, HARI, KOSHI and resilience to those of woolen fabric. The fabric also had a good color depth and lightfastness.

INDUSTRIAL APPLICABILITY

The fibers of the present invention have not only excellent dyeability and deep color development but also a high shrinkage ratio and shrinking stress, as well as excellent lightfastness and colorfastness. The fibers are hence useful when used by themselves and also as a component of mixed yarns, sheath-core textured yarns or blended yarns. Composite fibers having a component of the polyester constituting the fibers of the present invention can develop fine crimps and therefore give fabrics having good elasticity.

TABLE 1

| Ref. Ex. | Copolymerization compound | Amount colymerized (mol %) | Intrinsic viscosity (dl/g) | Tg (°C.) | Tm (°C.) | ΔH (J/g) |
|---|---|---|---|---|---|---|
| A | 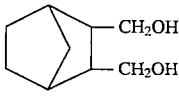 | 5 | 0.70 | 78 | 241 | 36 |
| B | " | 10 | 0.70 | 80 | 230 | 31 |
| C | " | 15 | 0.70 | 83 | 218 | 26 |
| D | 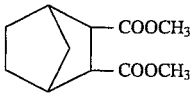 | 5 | 0.70 | 73 | 240 | 38 |
| E | " | 10 | 0.70 | 71 | 229 | 34 |
| F | " | 15 | 0.70 | 69 | 218 | 27 |
| G | 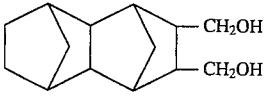 | 5 | 0.70 | 80 | 239 | 35 |
| H | " | 10 | 0.70 | 85 | 228 | 26 |
| I | " | 15 | 0.70 | 89 | 218 | 20 |
| J | 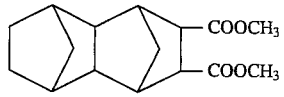 | 5 | 0.70 | 75 | 240 | 33 |
| K | " | 10 | 0.70 | 76 | 227 | 27 |
| L | " | 15 | 0.70 | 76 | 217 | 18 |
| M | 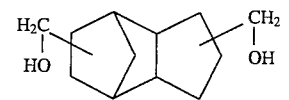 | 5 | 0.70 | 77 | 239 | 35 |
| N | " | 10 | 0.70 | 79 | 225 | 28 |
| O | " | 15 | 0.70 | 82 | 216 | 20 |

TABLE 1-continued

| Ref. Ex. | Copolymerization compound | Amount colymerized (mol %) | Intrinsic viscosity (dl/g) | Tg (°C.) | Tm (°C.) | ΔH (J/g) |
|---|---|---|---|---|---|---|
| P | (structure: tricyclic with —COOCH$_3$, —COOCH$_3$) | 5 | 0.70 | 78 | 238 | 28 |
| Q | " | 10 | 0.70 | 81 | 223 | 19 |

TABLE 2

| Ref. Ex. | Copolymerization compound | Amount colymerized (mol %) | Intrinsic viscosity (dl/g) | Tg (°C.) | Tm (°C.) | ΔH (J/g) |
|---|---|---|---|---|---|---|
| a | — | 1 | 0.70 | 75 | 254 | 42 |
| b | (norbornane with —CH$_2$OH, —CH$_2$OH) | 1 | 0.70 | 75 | 250 | 40 |
| c | (norbornane with —COOCH$_3$, —COOCH$_3$) | 1 | 0.70 | 75 | 251 | 40 |
| d | (bicyclic with —CH$_2$OH, —CH$_2$OH) | 1 | 0.70 | 75 | 249 | 38 |
| e | (bicyclic with —COOCH$_3$, —COOCH$_3$) | 1 | 0.70 | 75 | 250 | 39 |
| f | (structure with H$_2$C–OH, CH$_2$–OH) | 1 | 0.70 | 75 | 249 | 39 |
| g | (tricyclic with —COOCH$_3$, —COOCH$_3$) | 1 | 0.70 | 75 | 248 | 38 |
| h | (norbornane with —CH$_2$OH, —CH$_2$OH) | 1 | 0.70 | 89 | — | 0 |

TABLE 3

| Ref. Ex. | Copolymerization compound | Amount colymerized (mol %) | Intrinsic viscosity (dl/g) | Tg (°C.) | Tm (°C.) | ΔH (J/g) |
|---|---|---|---|---|---|---|
| i | (norbornane with —COOCH$_3$, —COOCH$_3$) | 30 | 0.70 | 60 | — | 0 |

TABLE 3-continued

| Ref. Ex. | Copolymerization compound | Amount colymerized (mol %) | Intrinsic viscosity (dl/g) | Tg (°C.) | Tm (°C.) | ΔH (J/g) |
|---|---|---|---|---|---|---|
| j | [structure with two CH₂OH groups] | 30 | 0.70 | 103 | — | 0 |
| k | [structure with two COOCH₃ groups] | 30 | 0.70 | 76 | — | 0 |
| l | [structure with H₂C-OH and CH₂-OH groups] | 30 | 0.70 | 87 | — | 0 |
| m | [structure with two COOCH₃ groups] | 30 | 0.70 | 79 | — | 0 |
| n | Isophthalic acid | 10 | 0.70 | 70 | 232 | 32 |
| o | Isophthalic acid<br>EOBPA*⁾ | 4<br>4 | 0.70 | 74 | 235 | 30 |
| p | EOBPA | 4 | 0.70 | 76 | 242 | 35 |
| q | EOBPA | 8 | 0.70 | 76 | 235 | 28 |

*⁾EOBPA: ethylene oxide adduct of bisphenol A

TABLE 4

| Ex. | Type of polyester | Fiber form-ability | Drawing temp. °C. | Fiber properties Dsr % | Shrinking stress mg/d | Wsr % | Bire-frin-gence | Birefringence after shrinkage | Light-fastness, class 0.1% | 3% | K/S |
|---|---|---|---|---|---|---|---|---|---|---|---|
| 1-1 | A | Good | 100 | 27 | 380 | 24 | 0.132 | 0.117 | 5 | 4–5 | 18.2 |
| 2 | | | 120 | 24 | 380 | 17 | 0.133 | 0.115 | 5 | 4–5 | 18.0 |
| 2-1 | B | Good | 100 | 50 | 390 | 47 | 0.112 | 0.107 | 5 | 4–5 | 19.8 |
| 2 | | | 120 | 35 | 390 | 20 | 0.114 | 0.108 | 5 | 4–5 | 19.5 |
| 3-1 | C | Good | 100 | 64 | 380 | 59 | 0.095 | 0.087 | 4–5 | 4 | 21.1 |
| 2 | | | 120 | 42 | 390 | 34 | 0.093 | 0.083 | 4–5 | 4 | 20.7 |
| 4-1 | D | Good | 100 | 26 | 390 | 22 | 0.124 | 0.111 | 5 | 4–5 | 18.9 |
| 2 | | | 120 | 23 | 400 | 16 | 0.121 | 0.113 | 5 | 4–5 | 18.6 |
| 5-1 | E | Good | 100 | 46 | 400 | 41 | 0.103 | 0.095 | 5 | 4–5 | 20.5 |
| 2 | | | 120 | 32 | 400 | 20 | 0.104 | 0.093 | 5 | 4–5 | 20.5 |
| 6-1 | F | Good | 100 | 54 | 390 | 51 | 0.090 | 0.082 | 5 | 4–5 | 21.6 |
| 2 | | | 120 | 37 | 400 | 30 | 0.091 | 0.081 | 5 | 4–5 | 21.2 |
| 7-1 | G | Good | 100 | 28 | 410 | 25 | 0.120 | 0.107 | 5 | 4–5 | 19.4 |
| 2 | | | 120 | 26 | 400 | 18 | 0.119 | 0.105 | 5 | 4–5 | 19.2 |
| 8-1 | H | Good | 100 | 65 | 400 | 60 | 0.092 | 0.084 | 5 | 4–5 | 21.0 |
| 2 | | | 120 | 33 | 410 | 22 | 0.091 | 0.085 | 5 | 4–5 | 20.6 |
| 9-1 | I | Good | 100 | 73 | 390 | 68 | 0.073 | 0.065 | 4 | 4 | 22.1 |
| 2 | | | 120 | 46 | 390 | 40 | 0.070 | 0.062 | 4 | 4 | 21.7 |
| 10-1 | J | Good | 100 | 24 | 370 | 20 | 0.118 | 0.109 | 5 | 4–5 | 19.4 |
| 2 | | | 120 | 22 | 380 | 16 | 0.118 | 0.113 | 5 | 4–5 | 19.3 |
| 11-1 | K | Good | 100 | 41 | 380 | 35 | 0.089 | 0.082 | 5 | 4–5 | 20.8 |
| 2 | | | 120 | 28 | 380 | 21 | 0.090 | 0.081 | 5 | 4–5 | 20.9 |
| 12-1 | L | Good | 100 | 49 | 360 | 45 | 0.071 | 0.063 | 4–5 | 4 | 21.8 |
| 2 | | | 120 | 33 | 370 | 27 | 0.070 | 0.063 | 5 | 4–5 | 21.6 |
| 13-1 | M | Good | 100 | 28 | 430 | 24 | 0.134 | 0.115 | 4–5 | 4 | 18.5 |
| 2 | | | 120 | 24 | 440 | 20 | 0.130 | 0.117 | 4–5 | 4 | 18.7 |
| 14-1 | N | Good | 100 | 46 | 430 | 40 | 0.116 | 0.109 | 4–5 | 4 | 19.4 |
| 2 | | | 120 | 37 | 430 | 25 | 0.112 | 0.109 | 4–5 | 4 | 19.6 |
| 15-1 | O | Good | 100 | 58 | 410 | 51 | 0.093 | 0.088 | 4 | 4 | 20.6 |
| 2 | | | 120 | 50 | 420 | 43 | 0.095 | 0.090 | 4 | 4 | 20.5 |
| 16-1 | P | Good | 100 | 47 | 410 | 42 | 0.110 | 0.101 | 5 | 4 | 19.7 |

TABLE 4-continued

| Ex. | Type of polyester | Fiber formability | Drawing temp. °C. | Fiber properties | | | | Birefringence after shrinkage | Lightfastness, class | | K/S |
|---|---|---|---|---|---|---|---|---|---|---|---|
| | | | | Dsr % | Shrinking stress mg/d | Wsr % | Birefringence | | 0.1% | 3% | |
| 2 | | | 120 | 36 | 420 | 30 | 0.111 | 0.099 | 5 | 4 | 19.9 |
| 17-1 | Q | Good | 100 | 66 | 400 | 61 | 0.082 | 0.070 | 4–5 | 4 | 21.0 |
| 2 | | | 120 | 43 | 410 | 39 | 0.080 | 0.073 | 4–5 | 4 | 20.7 |

TABLE 5

| Comp. Ex. | Type of polyester | Fiber formability | Drawing temp. °C. | Fiber properties | | | | Birefringence after shrinkage | Lightfastness, class | | K/S |
|---|---|---|---|---|---|---|---|---|---|---|---|
| | | | | Dsr % | Shrinking stress mg/d | Wsr % | Birefringence | | 0.1% | 3% | |
| 1-1 | a | Good | 100 | 17 | 400 | 12 | 0.165 | 0.156 | 5 | 4–5 | 15.6 |
| 2 | | | 120 | 15 | 410 | 9 | 0.166 | 0.158 | 5 | 4–5 | 15.8 |
| 2-1 | b | Good | 100 | 17 | 400 | 13 | 0.156 | 0.145 | 5 | 4–5 | 16.1 |
| 2 | | | 120 | 16 | 400 | 10 | 0.158 | 0.148 | 5 | 4–5 | 16.0 |
| 3-1 | c | Good | 100 | 17 | 390 | 13 | 0.154 | 0.142 | 5 | 4–5 | 16.2 |
| 2 | | | 120 | 15 | 400 | 10 | 10.154 | 0.146 | 5 | 4–5 | 16.0 |
| 4-1 | d | Good | 100 | 18 | 410 | 14 | 0.153 | 0.145 | 5 | 4–5 | 16.4 |
| 2 | | | 120 | 16 | 410 | 11 | 0.156 | 0.145 | 5 | 4–5 | 16.4 |
| 5-1 | e | Good | 100 | 17 | 390 | 13 | 0.156 | 0.146 | 5 | 4–5 | 16.3 |
| 2 | | | 120 | 15 | 400 | 10 | 0.155 | 0.147 | 5 | 4–5 | 16.5 |
| 6-1 | f | Good | 100 | 18 | 410 | 13 | 0.159 | 0.151 | 5 | 4–5 | 15.9 |
| 2 | | | 120 | 16 | 420 | 11 | 0.159 | 0.152 | 5 | 4–5 | 15.8 |
| 7-1 | g | Good | 100 | 19 | 390 | 15 | 0.153 | 0.144 | 5 | 4–5 | 16.3 |
| 2 | | | 120 | 17 | 410 | 12 | 0.154 | 0.146 | 5 | 4–5 | 16.2 |
| 8 | h | Poor | — | — | — | — | — | — | — | — | — |
| 9 | i | Poor | — | — | — | — | — | — | — | — | — |
| 10 | j | Poor | — | — | — | — | — | — | — | — | — |
| 11 | k | Poor | — | — | — | — | — | — | — | — | — |
| 12 | l | Poor | — | — | — | — | — | — | — | — | — |
| 13 | m | Poor | — | — | — | — | — | — | — | — | — |
| 14-1 | n | Good | 100 | 24 | 210 | 18 | 0.142 | 0.131 | 4 | 4 | 17.6 |
| 2 | | | 120 | 20 | 240 | 16 | 0.143 | 0.134 | 4 | 4 | 17.1 |
| 15-1 | o | Good | 100 | 34 | 340 | 28 | 0.140 | 0.128 | 1 | 2 | 17.9 |
| 2 | | | 120 | 26 | 350 | 19 | 0.141 | 0.130 | 1 | 2 | 17.7 |
| 16-1 | p | Good | 100 | 31 | 330 | 27 | 0.145 | 0.131 | 1 | 2 | 17.1 |
| 2 | | | 120 | 24 | 330 | 18 | 0.143 | 0.132 | 1 | 2 | 16.9 |
| 17-1 | q | Good | 100 | 35 | 340 | 31 | 0.130 | 0.119 | 1 | 2 | 18.2 |
| 2 | | | 120 | 27 | 350 | 20 | 0.131 | 0.122 | 1 | 2 | 18.1 |

What is claimed is:

1. A polyester fiber comprising a polyester containing 2 to 20 mole % of a copolymerization component of a compound represented by the following structural formula (1)

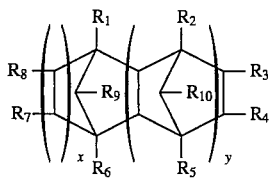

wherein $R_1$ through $R_{10}$ each represents a group selected from the group consisting of ester-forming functional groups, hydrogen atom and alkyl groups, one or two of $R_1$ through $R_{10}$ being ester-forming functional groups, x is 0 or 1, and y is an integer satisfying the following condition:

$1 \leq x+y \leq 3$.

2. A mixed filament yarn with differently shrinkable filaments comprising a filament group consisting of the polyester filament according to claim 1 and a group consisting of other filaments, said mixed filament yarn having a wet heat shrinkage ratio at 98° C. of 10 to 55% and a difference in filament length between the polyester filament group and other filament group of at least 4%.

3. A sheath-core textured yarn comprising a core filament yarn covered with a sheath yarn, said core filament yarn comprising the polyester filament according to the claim 1.

4. A blended spun yarn comprising staple fibers comprising the polyester fiber according to claim 1 and other synthetic fibers or natural fibers.

5. A a composite fiber comprising a polyester containing 2 to 20 mole % of a copolymerization component of a compound represented by the following structural formula (1)

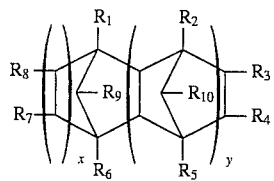 (1)
wherein $R_1$ through $R_{10}$ each represents a group selected from the group consisting of ester-forming functional groups, hydrogen atom and alkyl groups, one or two of $R_1$ through $R_{10}$ being ester-forming functional groups, x is 0 or 1, and y is an integer satisfying the following condition
$$1 \leq x+y \leq 3,$$
and another fiber-forming polymer.
* * * * *